United States Patent [19]
Taylor

[11] 3,867,550
[45] Feb. 18, 1975

[54] BULK SECONDARY FERMENTATION OF WINE

[76] Inventor: Walter S. Taylor, Bully Hill Rd. No. 2, Hammondsport, N.Y. 14840

[22] Filed: Aug. 17, 1972

[21] Appl. No.: 281,330

[52] U.S. Cl. .................. 426/15, 99/277, 99/277.1
[51] Int. Cl. ............................................. C12g 1/06
[58] Field of Search .............. 99/31, 35, 38, 41, 47, 99/276, 277, 277.1, 277.2; 426/15, 11

[56] References Cited
UNITED STATES PATENTS

| | | | |
|---|---|---|---|
| 57,009 | 8/1866 | Storm | 99/277.2 X |
| 540,279 | 6/1895 | Steen | 99/277.2 X |
| 2,610,123 | 9/1952 | Bruyere et al. | 99/47 |
| 3,530,786 | 9/1970 | Bellot et al. | 99/276 |

*Primary Examiner*—David M. Naff
*Attorney, Agent, or Firm*—Mason, Mason & Albright

[57] ABSTRACT

Sparkling wine is produced by carrying out secondary fermentation in an elongated bulk tank wherein settled yeast is scooped from the bottom of the tank continually by a rotating means which slowly raises the yeast along the sides of the tank to within the upper half of the tank where the yeast falls from the rotating means by gravity and settles downwardly through the wine.

7 Claims, 5 Drawing Figures

3,867,550

BULK SECONDARY FERMENTATION OF WINE

BACKGROUND OF THE INVENTION

Currently most champagne and other sparkling wines are produced by the bulk fermentation of a variety of grape juices or musts in an upright tank, followed by a natural secondary fermentation which causes the sparkling effervescence and takes place in the bottles to be sold. Flavoring, sugar and other additives are often mingled with wine previously made to produce a wine blend which can be said to be uniformly the same from year to year. In fact, the objective of most large wine companies in the United States is to retail wines that are the same year-in, year-out, and to avoid "vintage" wines and champagne. Cheaper grades of sparkling wines are made to effervesce by adding carbon dioxide. Also, bulk fermentation methods are used, but products have failed to achieve the quality of sparkling wines wherein the secondary fermentation takes place in the bottle.

However, this method adds considerably to the expense of producing sparkling wines because several operations, notably rotation of the bottles during fermentation and the disgorgement of debris resulting from fermentation in the bottle requires individual attention to each bottle. The aim of the present invention is to provide bulk secondary fermentation to produce sparkling wines of the best quality.

SUMMARY OF THE INVENTION

The present invention is concerned with a process of bulk fermenting sparkling wines in an elongated tank using only cane sugar as a sweetener and preferably wine from a single year's crop of grape. For instance sevel balnc grapes from a particular year's crop can be used in the production of a sparkling wine, so that a "vintage" wine results which has the best quality and characteristics of wines Estate Bottled. To achieve this objective, the present process does not involve artificial processing expedients such as ion exchange which reduces sediment but substantially increases the sodium content of the wine. Water is not added during the fermentation stage or otherwise. The addition of yeast for fermentation purposes in the process disclosed herein, is essential, however and involves the substantial continuous redistribution of yeast through the liquid being fermented in the tank. Redistribution is achieved by physically moving the yeast and causing the yeast to settle through the wine preferably by rotating a vaned tank or vanes in a special tank very slowly and without undue agitation which can have an adverse effect so that yeast settled on the bottom of the tank is periodically physically raised and then redistributed by allowing the yeast to fall and settle through the wine being fermented. Thus, the elongated tank disclosed herein simulates the usual champagne bottle in which secondary fermentation is carried out, but instead of being rotated intermittently, the vanes in the tank are preferably rotated or moved through the settled yeast and wine on a continuous basis, thus providing a champagne or sparkling wine of distinctive taste and bouquet. Essentially all fermentation is carried out in the bulk tank and it is not necessary that the wine be first bottled, aged, cleaned and recorked.

Other advantages of the invention will be recognized by those skilled in the art as the description progresses, reference being had to the accompanying drawings in which:

DESCRIPTION OF THE PREFERRED EMBODIMENT

Figure 1:
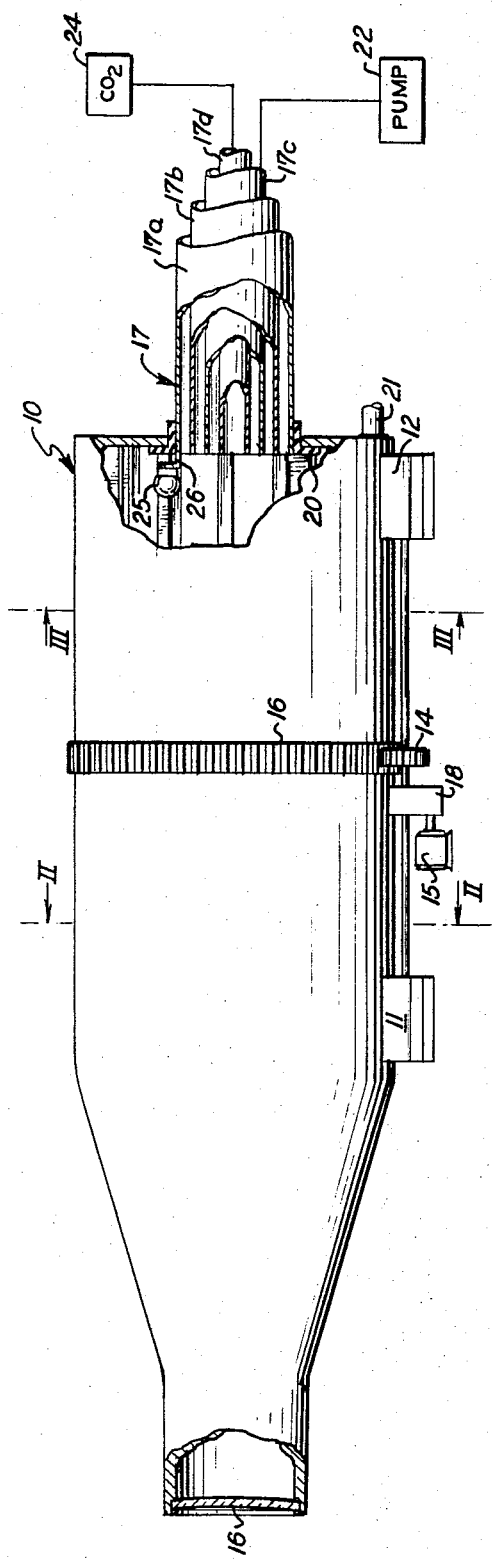
FIG. 1 is a side elevation in partial section of a first embodiment of the invention.

In FIG. 1, a horizontally positioned tank 10 is mounted for rotation on a pair of idler rollers 11 located at the front of the tank 10 and a second pair of idler rollers 12 at the rear. A centrally positioned gear 14 driven by motor 15 through a gear reduction box 18 engages the circumferential toothed gear 16 secured around tank 10 to rotate same about its longitudinal axis. Motor 15 is preferably a direct current variable speed motor. The tank 10 which may have a 2500 gallon capacity is preferably stainless steel and insulated to maintain the desired temperature, during the fermenting period. Cooling coils may be included adjacent the interior surface of the tank 10, but being a well-known expedient, are not shown. At ambient temperature, the fermentation can be carried out in about eight weeks.

Tank 10 includes an observation port 16 at a tapered end through which all interior space and surfaces are visible. At the opposite end, is a cluster of concentric tubes 17 which lead into the tank 10 about its longitudinal axis. The tube cluster 17 is fitted within an inner collar 20 which houses sealed bearing about which tube cluster 17 bears as the tank 10 is rotated. An outlet drain 21 is located at the tank's lowermost part, as seen in FIG. 1, so that the fermented product, when desired, can be drained. When the tank is cleaned, it can be emptied of fluid used for cleaning through drain 21. By rotation of tank 10, it is to be appreciated that the level of drain 21 relative to the lowermost portion of the tank can be adjusted to avoid the discharge of debris in the bottom of the tank until desired.

Tube 17c communicates with the tank 10 to furnish wine from a pump 22 into tank 10 until it is nearly filled. Yeast and cane sugar and other additives also may be passed through tube 17c into the tank 10. Tube 17c may also be utilized for cleaning solutions to enter tank 10 during cleaning operations. The adjacent inner tube 17d is a $CO_2$ line from a $CO_2$ source 24 which maintains the desired predetermined pressure, up to about ten atmospheres. Tube 17b comprises a duct that houses measuring devices and lead-ins to interior probes from devices such as thermometers, pressure gauges and the like used to monitor conditions within tank 10 during fermentation. The outermost tube 17a, is an electric line lead-in to a guarded incadescent bulb 25 which is mounted on a bracket 26 or the like connected to tube 17a.

Figure 3:
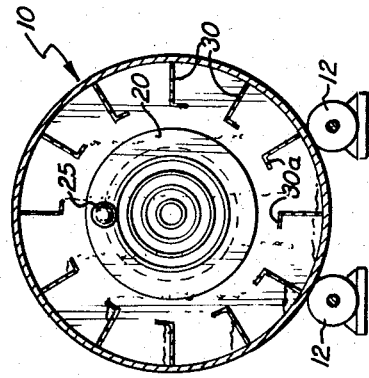
FIG. 3 is a sectional view similar to FIG. 2 taken on lines III—III of FIG. 1.
Figure 2:
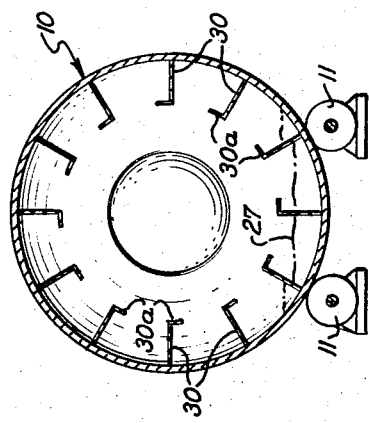
FIG. 2 is a sectional view of the embodiment shown in FIG. 1 taken on lines II—II of FIG. 1.

FIG. 2 shows the tank 10 at rest with a lower layer 27 of yeast which has settled to the bottom of tank 10 after it has been charged with wine, yeast and cane sugar. A plurality of longitudinal vanes 30 are mounted along the inner surfaces of the tank 10; the vanes 30 are preferably perforated and mounted perpendicular to the tank's inner surface where they are connected thereto by welding or other suitable means. Also, preferably the free end 30a of each vane is turned to extend in the normal direction of rotation of tank 10. When tank 10 is rotated slowly, say about one revolution per hour, the yeast layer 27 at the lowest part of the tank, is collected between the vanes 30, raised as illustrated in FIG. 3 and allowed to fall from the vanes by gravity, so that yeast within tank 10 is continually being redistributed to settle through the fermenting mixture as long as tank 10 is rotated. By providing an elongated tank with vanes that "scoop" up the yeast when the vanes slowly rotate about an axis that extends parallel to the longitudinal axis of the tank, yeast in tank 10 is slowly refiltered through the wine to give a special flavor and taste to the end product.

Figure 4:
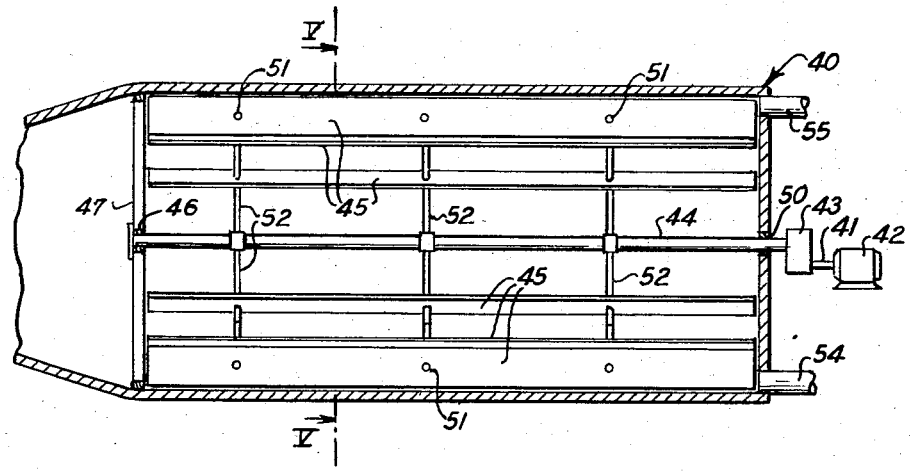
FIG. 4 is a sectional side elevation broken view of a second embodiment of the invention.
Figure 5:
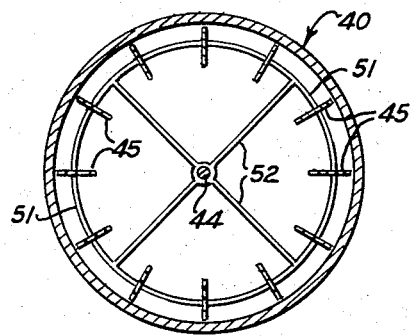
FIG. 5 is a sectional view of the embodiment shown in FIG. 4 taken on lines V—V of FIG. 4.

FIG. 4 shows a modified horizontally positioned tank 40. The other end which is broken off in FIG. 4 is identical to the tapered end having observation port 16 in FIG. 1. Shaft 41 of motor 42 is connected via a gear reduction box 43 to the vane supporting shaft 44 which supports a plurality of longitudinal vanes 45. Shaft 44 is journalled in a bearing 46 held by a support frame 47 at the front end of the tank 40. A similar bearing 50 is held and sealed in the wall of tank 40 adjacent the connection of shafts 41 and 44.

The vanes 45 are held by three spaced apart rings 51 which in turn are secured to shaft 44 by spokes 52. A conduit 54 conducts wine in and out of tank 40. Duct 55 may be utilized to convey $CO_2$ into tank 40 and for venting purposes when the tank is filled or emptied. Appropriate further entry ports (not shown) for the discharge and filling of tank 10 and measuring instrument probes and the like may be included as desired.

In operation, the vanes 45 in tank 40 are rotated at about one revolution per hour to lift settled yeast and cause it to fall through the wine contained therein as before. Motor 42, like motor 15, is preferably a variable speed direct current motor and tank 10 and vanes 45 are therefore capable of varying rates of rotation although one revolution per hour is operable. In the process of cleaning the tanks between fermentations, the motors 15 and 42, are run at high speed through cycles wherein cleaning solution is introduced into the bottom of the tank followed by rinsing water so that it is not necessary to clean the interiors of the tank by hand.

After about eight weeks of fermentation in tanks 10 and 40, the wine is a sparkling wine which, after suitable filtration, is ready to be bottled. However, prior to removal of the sparkling wine from the tanks, rotation of the vanes is stopped and the wine is normally chilled to about 35°F. and allowed to settle.

Having described my invention, what I desire to claim as new and cover by Letters Patent of the United States is:

1. A process for bulk secondary fermenting of wine slowly and continuously to produce sparkling wine comprising the mixing of added yeast through wine in an elongated bulk tank by the steps of mechanically scooping substantially all settled yeast from the bottom of the tank by rotating means which rotate comparatively slowly whereby the wine is not unduly agitated, slowly raising the yeast along the sides of the tank on a continual basis by said rotating means to within the upper half of said tank and thereafter allowing the yeast to fall from said rotating means by gravity and settle downwardly and filter through the wine while decomposing, said process being carried out under pressure.

2. A process in accordance with claim 1 wherein the yeast is raised by rotating the tank, said rotating means comprising horizontal vanes connected to the interior of said tank.

3. A process in accordance with claim 1 wherein said rotating means comprise horizontal vanes proximate the interior walls of said tank, the yeast being raised by rotating said horizontal vanes along the interior walls of said tank.

4. A process in accordance with claim 1 wherein the yeast settling to the bottom of the tank is recycled through the wine about once an hour.

5. A process in accordance with claim 1 wherein said pressure is maintained at about ten atmospheres.

6. A process in accordance with claim 1 wherein said process is continued for about two months and thereafter the wine is removed from said tank, filtered and bottled.

7. A process in accordance with claim 1 wherein said wine is initially conveyed to said tank in a chilled condition.

* * * * *